United States Patent [19]
Sakamoto

[11] Patent Number: 5,663,640
[45] Date of Patent: Sep. 2, 1997

[54] ROLLING BEARING UNIT WITH ROTATIONAL SPEED SENSOR AND REMOVABLE HOLDER FOR A SENSOR WIRING HARNESS

[75] Inventor: Junshi Sakamoto, Fujisawa, Japan

[73] Assignee: NSK, Ltd., Tokyo, Japan

[21] Appl. No.: 554,171

[22] Filed: Nov. 6, 1995

[30] Foreign Application Priority Data

Nov. 4, 1994 [JP] Japan .................... 6-271026

[51] Int. Cl.$^6$ .............. G01P 3/42; G01P 3/488; F16C 32/00; B60T 8/72
[52] U.S. Cl. ............ 324/173; 324/207.25; 384/448
[58] Field of Search .................... 324/173, 174, 324/207.22, 207.25; 310/68 B, 168; 188/181 R; 384/446, 448; 361/826

[56] References Cited

U.S. PATENT DOCUMENTS 5,010,290   4/1991   Foster .................... 324/173
5,011,303   4/1991   Caron .

FOREIGN PATENT DOCUMENTS

2706959   12/1994   France .

*Primary Examiner*—Walter E. Snow
*Attorney, Agent, or Firm*—Evenson, McKeown, Edwards & Lenahan P.L.L.C.

[57] ABSTRACT

A rolling bearing unit with rotational speed sensor has a holder releasably engaged with the sensor cover, such that prior to installation, the holder is externally engaged with the cover, with the harness passed out through an opening of the holder and wound around the wrapping tube portion of the holder, so that the long harness does not hang down at the time of shipping and installation of the speed sensing rolling bearing unit, and hence does not interfere with these operations.

1 Claim, 5 Drawing Sheets

ROLLING BEARING UNIT WITH ROTATIONAL SPEED SENSOR AND REMOVABLE HOLDER FOR A SENSOR WIRING HARNESS

BACKGROUND OF THE INVENTION

1. Field of the Invention

The present invention relates to a rolling bearing unit fitted with a rotational speed sensor (referred to hereunder as a speed sensing rolling bearing unit), used for rotatably supporting a vehicle wheel on a suspension unit, and detecting the rotational speed of the vehicle wheel.

2. Description of the Related Art

Figure 8:
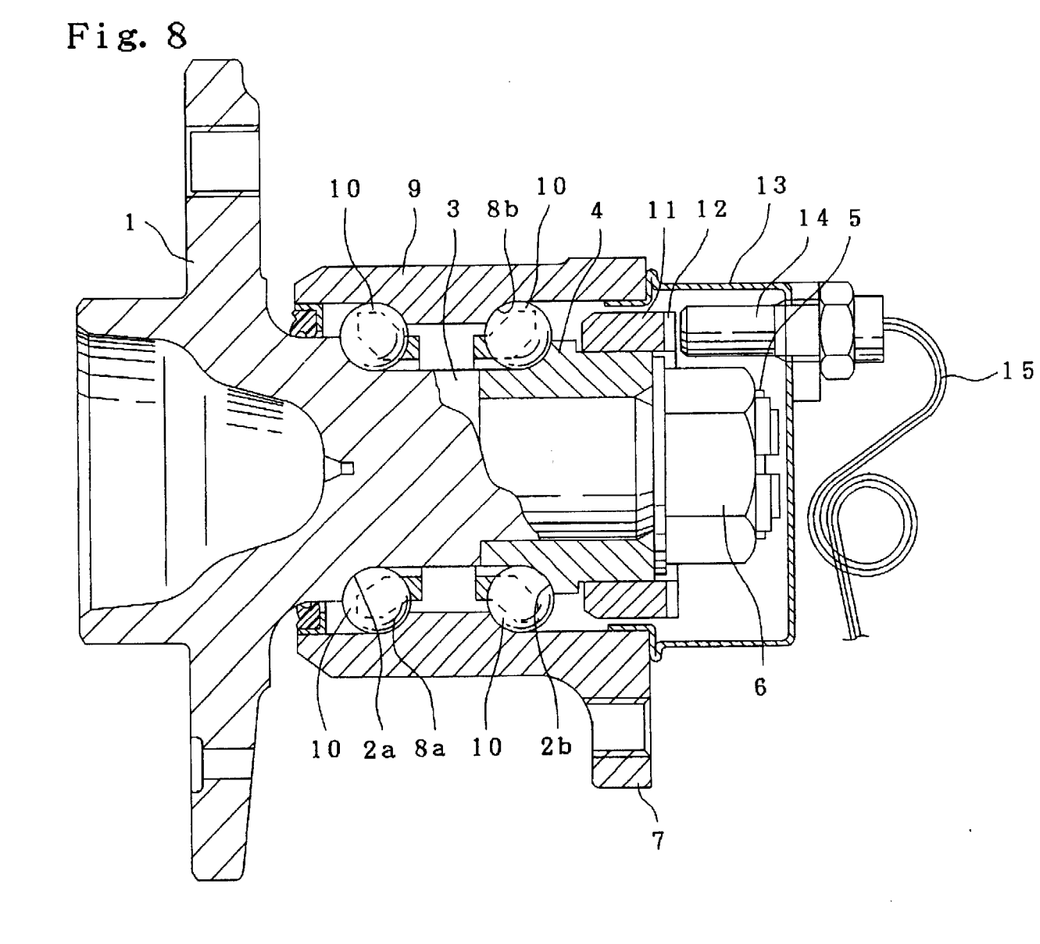
FIG. 8 is a cross-sectional view showing a first example of a conventional construction.

Referring to FIG. 8, there is shown an example of a speed sensing rolling bearing unit as disclosed in U.S. Pat. No. 4,907,445, for rotatably supporting a vehicle wheel on a suspension unit, and detecting the rotational speed of the wheel in order to control an anti-lock braking system (ABS) or a traction control system (TCS).

The speed sensing rolling bearing unit shown in FIG. 8, comprises a hub 3 having a flange 1 for wheel fixture provided on its axially outer end portion (hereunder axially outer end means the outer end in a widthwise direction when fitted to a vehicle; the left end in FIG. 8), and a first inner ring raceway 2a formed on an outer peripheral face of its axially central portion, and an inner ring member 4 externally fitted to the outer peripheral face of the central portion of the hub 3 and having a second inner ring raceway 2b formed on an outer peripheral face thereof. The inner ring member 4 constitutes an inner ring assembly together with the hub 3.

A threaded portion 5 is formed on an outer peripheral face of the axially inner end of the hub 3 (hereunder axially inner end means the end towards the center in a widthwise direction when fitted to a vehicle; the right end in FIG. 8), and a nut 6 is threaded onto the threaded portion 5 to thus press against the axially inner end face of the inner ring member 4, and thereby secure the inner ring member 4 at a predetermined location on the outer peripheral face of the hub 3.

An outer ring member 9 has an attachment portion 7 for attachment to a suspension unit (not shown), on an outer peripheral face thereof, and a double row outer ring raceway 8a, 8b is formed on an inner peripheral face thereof.

A plurality of rolling elements 10 are provided between the outer ring raceways 8a, 8b and the first and second inner ring raceways 2a, 2b, so that the hub 3 for wheel fixture is rotatably supported inside the outer ring member 9 supported on the suspension unit.

A cylindrical tone wheel 11 is externally secured to an axially inner half portion of the inner ring member 4. Recesses/protrusions 12 are formed on an axially inner end face (the end face on the widthwise inner side when fitted to a vehicle; the right end in FIG. 8) of the tone wheel 11, so that the magnetic characteristics of the inner end face are changed alternately in the circumferential direction and at an even spacing.

A cover 13 is fitted to an opening portion at the axially inner end of the outer ring member 9 to cover the opening of the outer ring member 9, and a sensor 14 is fixed to the cover 13, so that an axially outer end face of the sensor 14 is opposed to the recesses/protrusions 12.

A detection signal from the sensor 14 is taken out by means of a harness 15, and sent to a controller (not shown) for controlling an anti-lock braking system (ABS) or a traction control system (TCS).

At the time of operation of the speed sensing rolling bearing unit as described above, a vehicle wheel fixed to the flange 1 on the axially outer end portion of the hub 3 is rotatably supported relative to a suspension unit to which the outer ring member 9 is attached. When the tone wheel 11, externally secured to the inner ring member 4, rotates with rotation of the vehicle wheel, the output of the sensor 14 facing the recesses/protrusions 12 on the inner end face of the tone wheel 11 changes. Since the frequency with which the output of the sensor 14 changes is proportional to the rotational speed of the vehicle wheel, then if the output signal from the sensor 14 is input to a controller (not shown) by means of the harness 15, the rotational speed of the wheel can be obtained, so that an anti-lock braking system (ABS) or a traction control system (TCS) can be appropriately controlled.

The harness 15 associated with the abovementioned speed sensing rolling bearing unit can be up to more than 70 cm in length. This is because the speed sensing rolling bearing unit is mounted on the so-called spring foot portion on the wheel side of the suspension spring, whereas the mating member into which the connector on the end of the harness 15 is inserted is provided on the so-called spring head portion on the chassis side of the suspension spring. The harness 15 which must be long to cope with this situation, thus tends to hang down during shipping, and during installation of the speed sensing rolling bearing unit, interfering with the shipping and installation, and thus impairing the efficiency of these operations.

A construction has been adopted wherein, to avoid the drop in work efficiency due to the hanging harness, a connector is provided on the side of the speed sensing rolling bearing unit, and a plug on the end of the harness is inserted into the connector after completion of the installation.

However, when such a construction is adopted, the size of the speed sensing rolling bearing unit is increased due to the connector portion. There are thus cases where the above construction cannot be adopted, depending on the type of vehicle, because the installation space for the speed sensing rolling bearing unit is limited, or because the size increase for the connector portion is undesirable. Moreover, when the connector is connected on the wheel side of the suspension spring, which takes a considerable amount of vibration, there is the likelihood of a faulty electrical connection.

SUMMARY OF THE INVENTION

The speed sensing rolling bearing unit according to the present invention has been developed in view of the above situation.

An object of the present invention is to provide an improved speed sensing rolling bearing unit which comprises a stationary outer ring member having an outer ring raceway on an inner peripheral face thereof, a rotatable inner ring assembly having an inner ring raceway on an outer peripheral face thereof, a plurality of rolling elements provided between the outer ring raceway and the inner ring raceway, a cover fixed to an open end portion of the outer ring member, a sensor supported inside the cover, a rotatable tone wheel made from a magnetic material and supported on the inner ring assembly, a harness provided for taking out an output signal from the sensor, a connector provided on an end portion of the harness, and a holder for harness releasably engaged with the cover.

An object of the present invention is to provide a holder for harness in a rolling bearing unit with speed sensor and cover comprising a support cylinder portion externally engagable with the cover, a connecting portion bent radially inwards from an end rim of the support cylinder portion, a wrapping tube portion formed on an inner peripheral rim of the connecting portion and protruding an axially opposite direction to the support cylinder portion, an engagement portion for engaging with a connector, formed on a side face of the connecting portion on the same side as the wrapping tube portion, and an opening formed in a portion of the connecting portion so that the connector and harness can freely pass through the opening.

Another object of the present invention is to provide a holder for harness in the rolling bearing unit with speed sensor and cover comprising a support cylinder portion, a connecting portion with an opening and a wrapping tube portion, such that prior to installation, the support cylinder portion of the holder is externally engaged with the cover, the harness is then passed out through the opening to the opposite side of the connecting portion and wound around the wrapping tube portion, the connector on the end portion of the harness is then engaged in the engaging portion, whereby the long harness does not hang down at the time of shipping and installation of the speed sensing rolling bearing unit, and hence does not interfere with these operations.

DETAILED DESCRIPTION OF THE PREFERRED EMBODIMENTS

The speed sensing rolling bearing unit according to the present invention, as with the beforementioned conventional speed sensing rolling bearing unit, comprises a stationary outer ring member having an outer ring raceway on an inner peripheral face thereof, a rotatable inner ring assembly having an inner ring raceway on an outer peripheral face thereof, a plurality of rolling elements provided between the outer ring raceway and the inner ring raceway, a cover fixed to an open end portion of the outer ring member, a sensor supported inside the cover, a rotatable tone wheel made from a magnetic material and supported on the inner ring assembly, a harness for taking out an output signal from the sensor, and a connector on an end portion of the harness.

In particular, with the speed sensing rolling bearing unit of the present invention, a holder which is releasably engaged with the cover is provided.

The holder comprises; a support cylinder portion externally engagable with the cover, a connecting portion bent radially inwards from an end rim of the support cylinder portion, a wrapping tube portion formed on an inner peripheral rim of the connecting portion and protruding in an axially opposite direction to the support cylinder portion, an engagement portion for engaging with a connector, formed on a side face of the connecting portion on the same side as the wrapping tube portion, and an opening formed in a portion of the connecting portion so that the connector and harness can freely pass through the opening.

With the speed sensing rolling bearing unit according to the present invention constructed as described above, the operation at the time of detecting the rotational speed of the vehicle wheel is the same as for the beforementioned conventional speed sensing rolling bearing unit.

However, in the case of the speed sensing rolling bearing unit according to the present invention, at the time of shipping, and assembly before installing into a vehicle, the handing down of the long harness scan be avoided. More specifically, prior to installation, the support cylinder portion of the holder is externally engaged with the cover. The harness is then passed out through the opening to the opposite side of the connecting portion and wound around the wrapping tube portion. The connector on the end portion of the harness is then engaged in the engaging portion. As a result, the long harness does not hand down at the time of shipping and installation of the speed sensing rolling bearing unit, and hence does not interfere with these operations.

The embodiment shown in the figures, is applied to a rolling bearing unit for supporting a driven wheel (rear wheel of a front engine-rear wheel drive (FR) vehicle, or front engine-front wheel of a front wheel drive vehicle, or both wheels of a four-wheel drive vehicle). However, the present invention is not limited to bearing units for driven wheels, and is also applicable to rolling bearing units as shown in FIG. 8 for supporting non-driven or free wheels (front wheel of a front engine-rear wheel drive (FR) vehicle, or rear wheel of a front engine-front wheel drive (FR) vehicle).

Moreover the construction of the sensor is not limited to the annular shape device shown in the figures, but may be a rod shaped device as shown in FIG. 8.

Figure 1:
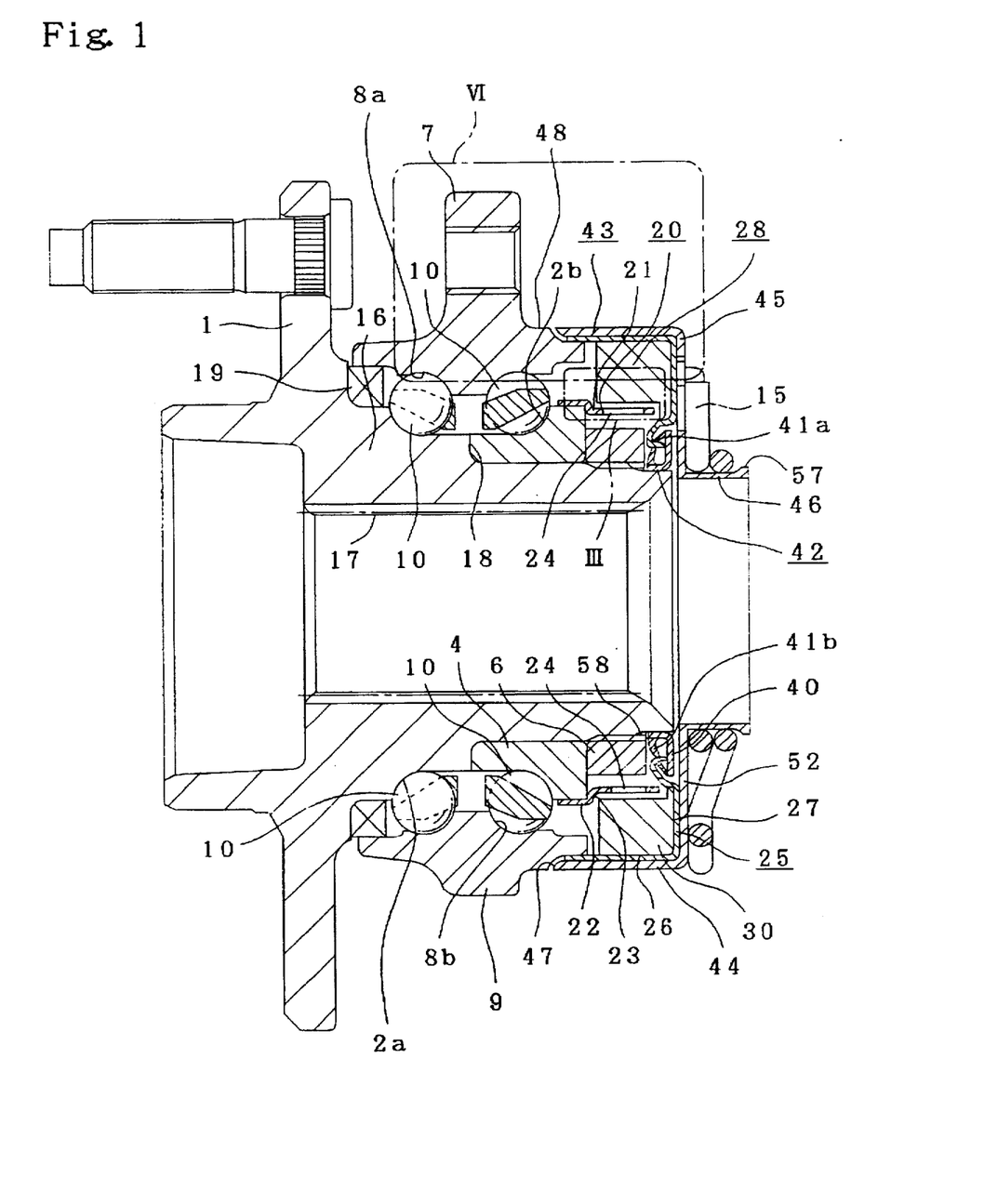
FIG. 1 is a cross-sectional view of a first embodiment of the present invention.
Figure 2:
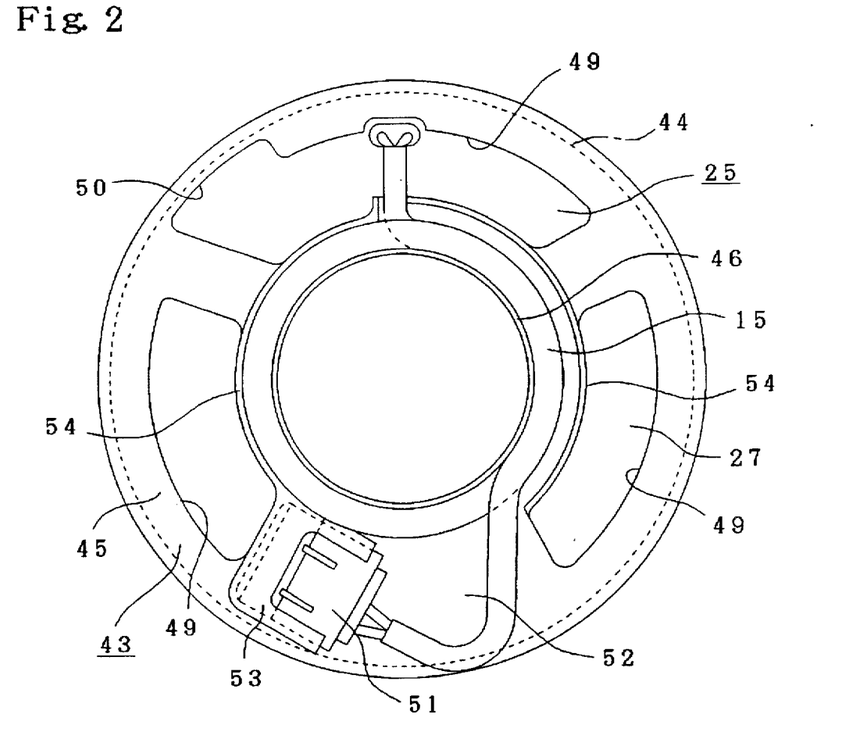
FIG. 2 is a view from the right hand side of FIG. 1 with parts omitted for clarity.
Figure 3:
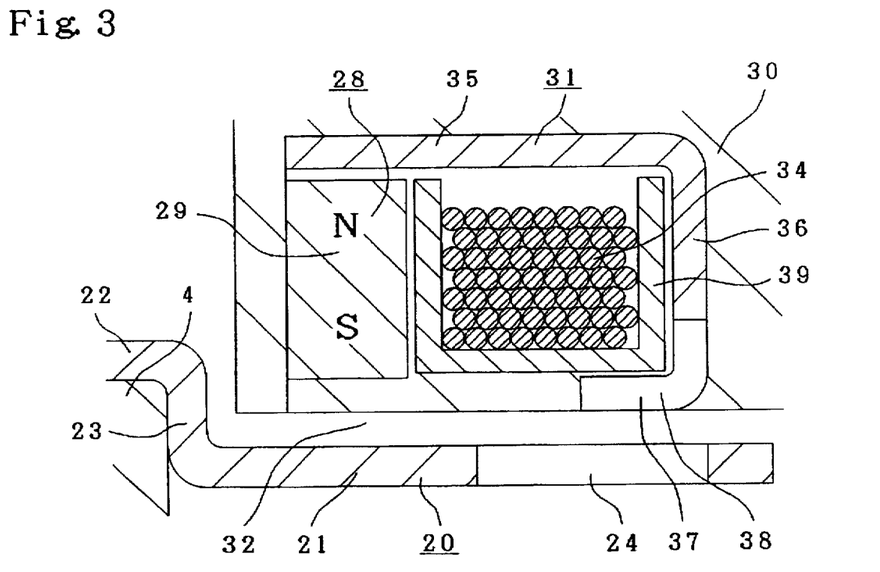
FIG. 3 is an enlarged cross-sectional view of part III of FIG. 1, illustrating a sensor portion.

FIGS. 1 through 3 show an embodiment of the present invention.

An inner peripheral face of a cylindrical hub 16 is formed with a male spline 17 for engaging with a shaft for driving the hub 16. The hub 16 is formed with a flange 1 for wheel fixture, on an outer peripheral face of an axially outer end portion, while formed with a first inner ring raceway 2a and a step portion 18 on an outer peripheral surface of an axially central portion. An inner ring member 4 formed with a second inner ring raceway 2b on an outer peripheral face thereof, is externally fitted to the outer peripheral face of the hub 16, with an axially outer end face thereof (left end face of FIG. 1) abutted against the step portion 18.

There is also the case where, instead of directly forming the first inner ring raceway 2a on the outer peripheral surface of the hub 16, another inner ring member (not shown) is provided separate from the hub 16, and externally fitted to the hub 16 together with the inner ring member 4.

A male-threaded portion 58 is formed on a portion of the hub 16 near the axially inner end thereof. An inner ring assembly is thus formed by fixing the inner ring member 4 at a predetermined location on the outer peripheral face of the hub 16 by means of a nut 6 which is threaded onto the male-threaded portion 58 and tightened.

An outer ring member 9 is located around the hub 16, and provided with an attachment portion 7 on an outer peripheral face of the central portion thereof, for securing the outer ring member 9 to a suspension unit.

An inner peripheral face of the outer ring member 9 is formed with respective outer ring raceways 8a, 8b opposite to the first and second inner ring raceways 2a, 2b.

A plurality of rolling elements 10 are respectively provided between the first and second inner ring raceways 2a, 2b and the outer ring raceways 8a, 8b, so that the hub 16 is free to rotate inside the outer ring member 9.

With the example shown in the figures, balls are used for the rolling elements 10. However in the case of a hub unit for heavy vehicles, tapered rollers may be used.

A seal ring 19 is fitted between the inner peripheral face at the axially outer end of the outer ring member 9, and the outer peripheral face of the hub 16, to cover the opening at the axially outer end (left end in FIG. 1) of the space for accommodating the plurality of rolling elements 10, between the inner peripheral face of the outer ring member 9 and the outer peripheral face of the hub 16.

A tone wheel 20 is formed in an overall cylindrical shape by press forming a magnetic metal sheet of low magnetic resistance e.g. a cold rolled steel sheet such as SPCC (JIS G 3141) having a thickness of approximately 0.5 to 2.0 mm.

A base end (left end in FIG. 1) of the tone wheel 20 is externally fixed to an axially inner end portion (right end portion in FIG. 1) of the inner ring member 4, which is away from the second inner ring raceway 2b.

The tone wheel 20 is made with a smaller diameter portion 21 and larger diameter portion 22 formed concentric with each other and connected by a step portion 23.

The tone wheel 20 is fixedly supported on the inner ring member 4, with the larger diameter portion 22 externally fitted to the outer peripheral face at the axially inner end of the inner ring member 4, with the step portion 23 abutted against the inner end rim of the inner ring member 4. Consequently, the smaller diameter portion 21 is supported concentric with the inner ring member 4.

A plurality of through-apertures 24 in a first cutout section are formed in the smaller diameter portion 21 at even spacing around the circumference. The apertures 24 are formed in the same rectangular shape, with for example the long side aligned with the axial direction (left/right direction in FIG. 1).

Any other cut-outs instead of the through-apertures 24 in the first cut-out section can be used. When deep recesses or indentations are used in the first cut-out section, then the tip half portion of the smaller diameter portion 21 is formed on a comb-like shape.

As required, the surface of the tone wheel 20 may be formed with a thin electroplated layer of zinc to prevent corrosion of the surface of the tone wheel 20 prior to assembling into the speed sensing rolling bearing unit. Moreover, the spacing d (FIG. 4) of the cutouts in the first cutout section of the tone wheel 20 should be more than 1.0 times the plate thickness (0.5 to 2.0 mm). This is to prevent the intermediate portions between circumferentially adjacent cutouts from twisting when forming the first cutout section. Otherwise, the cross sectional shape of the intermediate portions would be deformed.

Figure 4:
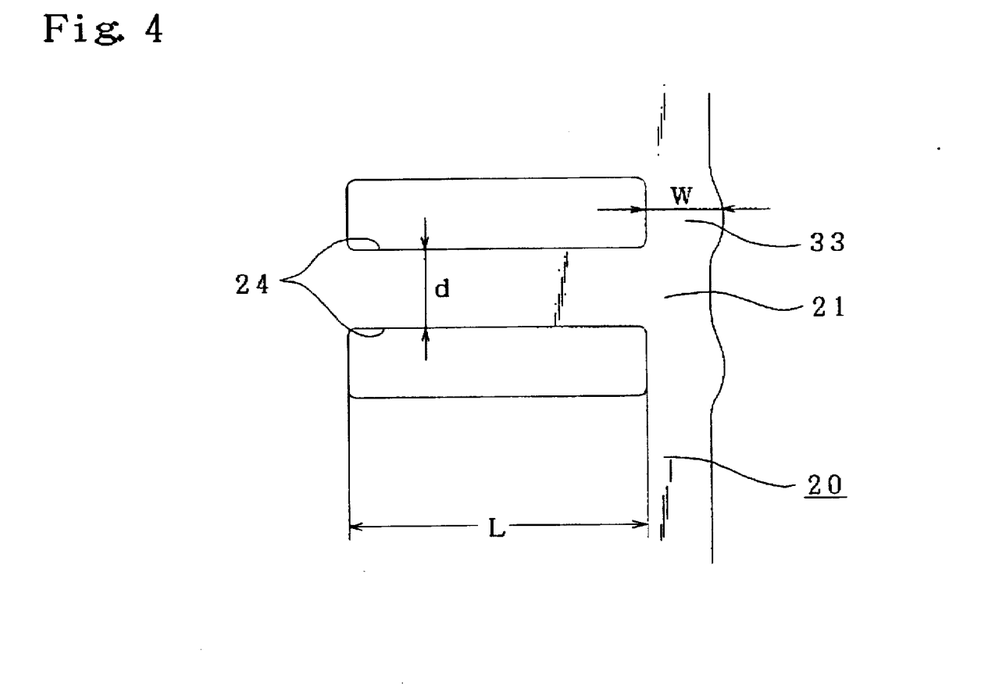
FIG. 4 is a partial plan view of the tone wheel corresponding to FIG. 3, showing parts of a tone wheel distorted during formation of apertures.

Furthermore, when the through-apertures 24 are adopted for the first cutout section, then the width w of the rim portion 33 between the axial end of the apertures 24 and the axial edge of the tone wheel 20 should be no less than 1.0 times the plate thickness. If this width w is too narrow, then as shown in FIG. 4, the rim 33 can be deformed resulting in a wavy edge shape to the tone wheel 20.

The length L of the apertures 24 is made approximately up to 10 times the plate thickness. If the length L is too large, then as with the case when the distance d is too small, the cross sectional shape of the intermediate portion between adjacent apertures 24 would be easily distorted.

The engagement length of the larger diameter portion 22 on the inner ring member 4 is set in the range of about 3 to 6 mm. This is to keep the axial length short (within about 6 mm), while maintaining rigidity of the engagement portion (more than about 3 mm).

A cover 25 is made in the form of a closed end cylinder, by for example press forming a metal plate such as a stainless steel plate or aluminum alloy plate, so that the opening at the axially inner end of the outer ring member 9 is covered with the cover 25. The cover 25 is formed in generally annular shape and comprised of a cylindrical portion 26 and a ring portion 27 in an L-shape cross section. An open end portion of the cylindrical portion 26 is externally fitted to the axially inner end portion of the outer ring member 9.

An overall annular shaped sensor 28 is mounted inside the cover 25. Since the cover 25 is not used as a flow path for the magnetic flux from a permanent magnet 29 constituting the sensor 28 (to be described hereunder), it is preferably made from a non-magnetic material such as synthetic resin, aluminum alloy or copper. Accordingly when a stainless steel plate is used, the non-magnetic stainless steel is preferable from the point of view of preventing leakage of the magnetic flux.

A synthetic resin body 30 in which is embedded the sensor 28 is fixedly fitted circumferentially inside the cover 25. In consideration of the operating temperature, a material such as PBT, 66-nylon, PPS and the like is used as the material for the synthetic resin body 30.

A pole piece 31 together with the permanent magnet 29 constitutes the sensor 28 (to be described hereunder).

If however the minimum distance between the pole piece 31 and the cover 25 can be kept to no less than twice the thickness of the small gap 32 between the inner peripheral face of the pole piece 31 and the outer peripheral face of the small diameter portion 21 of the tone wheel 20, then the cover 25 can be made of a low cost magnetic material such as SPCC.

This is because, if the minimum distance is large, then the majority of the magnetic flux output from the permanent magnets 29 will flow across the small gap 32.

If the cover 25 is made from SPCC, then to maintain rigidity, the plate thickness should be around 0.5 to 1.2 mm, and to prevent corrosion, 5 to 25 microns of zinc electroplating should be applied after a chromates treatment.

The sensor 28 comprising the permanent magnet 29, the pole piece 31 made from a magnetic material such as steel plate, and a coil 34, is formed in an overall annular shape by embedding the permanent magnet 29, the pole piece 31 and the coil 34 in the synthetic resin body 30.

The permanent magnet 29 of the sensor 28, is formed in an overall ring shape, and magnetized in the radial direction. That is to say with the example shown in the figures, the inner peripheral face of the permanent magnet 29 is made a south pole, while the outer peripheral face is made a north pole. However, from the point of view of the function of the sensor 28, there is no reason why the magnetized direction cannot be in the opposite direction.

In this respect, if the permanent magnets are magnetized in opposite directions and assembled with alternating magnetic directions in the permanent magnet manufacturing site for transportation to the sensor assembly site, then the efficiency in shipping from the permanent magnet manufacturing site to the sensor assembling site can be improved. This is because when the annular shaped permanent magnets 29 are shipped, the permanent magnets 29 with alternating magnetic directions can be tightly stacked axially together as shown in FIG. 5.

At this time, if the magnetized directions of the permanent magnets 29 are all the same, then since the end faces of the adjacent permanent magnets 29 have the same poles facing each other, there is mutual repulsion between them. As a result it is difficult to stack several permanent magnets 29 together without a small gap therebetween, and hence the efficiency of packing in a box is impaired.

Figure 5:
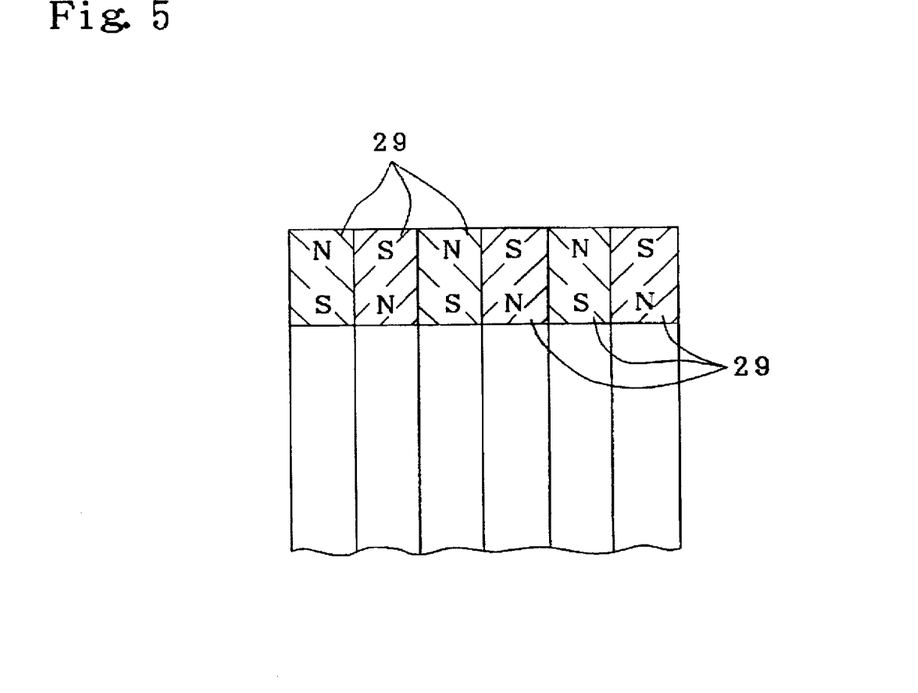
FIG. 5 is a partial, schematic cross-sectional view showing a stacking condition of annular permanent magnets for the sensor.

On the other hand, since the permanent magnets with opposite magnetic directions are arranged alternately as shown in FIG. 5, then several permanent magnets 29 can be packed together without a gap, so that packing efficiency is improved.

Since there is no problem in assembling the sensor with the permanent magnet magnetized in one direction or in the other direction, the sensors can be assembled with oppositely magnetized permanent magnets alternately, in one magnetic orientation and in the other magnetic orientation in the assembling site corresponding to the permanent magnets transferred from the manufacturing site.

In another way, instead of shipping the magnetized permanent magnets, they can be magnetized immediately before assembly in the sensor assembly site. Since they are all magnetized in the same direction in the sensor assembly site, the problem with shipping does not arise.

In any case, with the structural arrangement of the sensor 28, an inner peripheral face (S pole) of the permanent magnet 29 is opposed, across the small gap 32, to an outer peripheral face of a base end portion of the smaller diameter portion 21 of the tone wheel 20, in which the apertures 24 are not formed.

For the permanent magnet 29, the use of a rare earth type magnet with a high flux density per unit area has been considered. However, if a substantially annular shaped sensor 28 is used the output of sensor 28 can be made sufficiently large, without increasing the flux density per unit so high. Accordingly, a low cost magnet such as a standard ferrite magnet, or plastic magnet with a ferrite mixed in synthetic resin, may be used for the permanent magnet 29, enabling a reduction in manufacturing costs. For the plastic magnet material, a hexa-nylon is used generally.

The pole piece 31 is formed in an overall annular shape of approximate J-shape in cross section from a magnetic material such as SPCC, with a plate thickness of for example 0.5 to 2.0 mm. The surface of the pole piece 31 may be formed with a thin electroplated layer of zinc to prevent corrosion.

The pole piece 31 incorporates an outer cylindrical portion 35, a ring portion 36 bent radially inwards from one end (right end in FIG. 3) of the outer cylindrical portion 35, and an inner cylindrical portion 37 bent from the inner peripheral rim of the ring portion 36 to extend in the same direction as the outer cylindrical portion 35. An inner peripheral face on the other end (left end in FIG. 3) of the outer cylindrical portion 35 is located near to or in abutment with an outer peripheral face of the permanent magnet 29.

An inner peripheral face of the inner cylindrical portion 37 is faced to one portion of the tone wheel 20 in which the apertures 24 are formed.

Furthermore a second cutout section containing a plurality of cut-outs 38 is circumferentially formed, such that each cutout 38 extends axially through in the inner cylindrical portion 37 to part of the inner peripheral rims of the ring portion 36. The second cutouts 38 have a pitch equal to that of the apertures 24 (central angle pitch).

Accordingly the portion from the inner cylindrical portion 37 to the inner peripheral rim of the ring portion 36, is formed in a comb-teeth shape.

In the case of using a tone wheel with an even thicker plate thickness to avoid magnetic saturation, then this can be made by sintering. Moreover to simplify manufacture, the inner cylindrical portion 37 can be omitted, and the inner peripheral rim of the ring portion 36 is formed in a comb-teeth shape.

The coil 34 is formed as an annular shape with wire wound around a ring 39 of a non magnetic material, and is located in a region inside the inner peripheral face of pole piece 31 axially between the permanent magnet 29 and the ring portion 36. An induced EMF produced in the coil 34 is taken out by a harness 15 (FIGS. 1, 2).

An aperture (not shown) is therefore formed in a portion of the pole piece 31, and the wire of the harness 15 passed through this aperture.

Moreover the harness 15 is passed through an aperture formed in the ring portion 27 of the cover 25, and led out to outside of the cover 25.

A connector 51 is connected to the end of the harness 15. This connector 51 is engaged with another connector provided on the chassis side to thereby feed a detection signal taken out by the harness 15 to a controller provided on the chassis side.

A seal assembly 42 incorporating a case 40 and seal lips 41a, 41b, is provided between an inner peripheral rim of the cover 25 and an outer peripheral face on the end of the hub 16, to thereby cover the opening at the axially inner end of the space for housing the plurality of rolling elements 10.

A holder 43 is removably fitted to the cylindrical portion 26 of the cover 25. The holder 43 is made as a single body by injection molding a resilient material such as a synthetic resin, and is formed in a substantially annular shape of a crank shape cross section with a support cylinder portion 44, a connecting portion 45, and a wrapping tube portion 46. The inner diameter of the support cylinder portion 44 in a free condition is slightly smaller than the outer diameter of the cylindrical portion 26.

Moreover, a tapered face 47 in a bevel or flare shape is formed on the open end portion of the inner peripheral face of the support cylinder portion 44, with the inner diameter increasing towards the axial end. Accordingly, the support cylinder 44 is externally fitted to the cylindrical portion 26.

The material of the holder 43, the thickness of the support cylinder portion 44, and the difference between the outer diameter of the cylindrical portion 26 and the inner diameter of the support cylinder portion 44 is specified so that the force required to slide the support cylinder portion 44 onto and off the cylindrical portion 26 is of the order of a few kgf.

The axially inner end portion on the outer peripheral face of the outer ring member 9, to which the open end portion of the cylindrical portion 26 is externally secured, is made with a diameter sufficiently smaller than that of an engaging portion 48 which is internally fitted into an assembly bore (not shown) of a knuckle of a suspension unit. Consequently when the support cylinder portion 44 is externally fitted to the cylindrical portion 26, the outer peripheral face of the support cylinder portion 44 is made so as not to protrude radially outward from the outer peripheral face of the engaging portion 48. Accordingly, the engaging portion 48 can be internally fitted into the assembly bore, with the support cylinder portion 44 externally fitted on the cylindrical portion 26.

The connecting portion 45 of the holder 43 is bent radially inward from the inner end rim of the support cylinder portion 44. A plurality of openings 49 are formed in the connecting portion 45, with the purpose of saving the synthetic resin material and lightening the holder 43. A widened portion 50 through which the connector 51 can pass freely is formed in one part of at least one of the openings 49. The opening 49 with the widened portion 50 formed therein is referred to also as the opening portion.

An engagement portion 53 for releasably engaging with the connector 51 when pressed thereinto, is formed in a plate portion 52, constituting an intermediate portion between circumferentially adjacent openings 49.

The wrapping tube portion 46 is formed on the inner peripheral rim of the connecting portion 45 to protrude from the connecting portion 45 in an opposite axial direction to the support cylinder 44. A lip portion 57 is formed completely around the outer peripheral rim at the tip end of the wrapping tube portion 46.

Arcuate walls 54 are formed on one face of the connecting portion 45 surrounding the wrapping tube portion 46 and concentric therewith. The arcuate walls 54 are discontinued at the portion where the harness 15 is led out from the ring portion 27 of the cover 25, and at the portion forming the engagement portion 53.

With the speed sensing rolling bearing unit of the present invention constructed as described above, when the tone wheel 20 rotates with the hub 16, the flux density inside the pole piece 31 facing the tone wheel 20 changes, so that a voltage induced in the coil 34 changes at a frequency proportional to the rotational speed of the hub 16.

The reason for the change in voltage induced in the coil 34 with the change in density of the magnetic flux flowing in the pole piece 31 is the same as for the well known case with rotational speed detection sensors, and hence explanation is omitted.

As follows however is an explanation of the reason for the change in the magnetic flux density flowing in the pole piece 31 with rotation of the tone wheel 20.

With the plurality of apertures 24 provided in the tone wheel 20, and the plurality of cut-outs 38 provided in the pole piece 31, since the pitch is the same, then they are simultaneously opposed to each other around the whole circumference with rotation of the tone wheel 20. Moreover, in the condition wherein the apertures 24 and the cut-outs 38 are opposed to each other as shown in FIG. 3, the columns of magnetic material between adjacent pairs of apertures 24, and the tongues of magnetic material between adjacent pairs of cut-outs 38 are also opposed to each other across the small gap 32. With the respective columns and tongues opposed to each other in this way, a high density flux flows between the tone wheel 20 and the pole piece 31.

On the other hand, if the apertures 24 and the cut-outs 38 are out of phase by one half, the density of the flux flowing between the tone wheel 20 and the pole piece 31 drops. That is to say, in this condition, the apertures 24 provided in the tone wheel 20 are opposed to the tongues, and at the same time the cut-outs 38 provided in the pole piece 31 are opposed to the columns. With the respective columns opposed to the cut-outs 38, and the tongues opposed to the apertures 24 in this way, then a relatively large space exists between the tone wheel 20 and the pole piece 31 around the whole circumference. Therefore, in this condition, the density of the flux flowing between the tone wheel 20 and the pole piece 31 decreases. As a result of the above situation, the voltage induced in the coil 34 changes in proportion to the rotational speed of the hub 16.

In order to ensure an adequate change in flux density, the width of the apertures 24 is preferably made wider than that of the tongues, and the width of the cut-outs 38 is preferably made wider than that of the columns. That is to say, the width of the apertures 24 and the cut-outs 38 is made wider than that of the columns and the tongues. For example, the circumferential dimension of the columns is made 35 to 45% of the pitch of the columns. In this case, the width of the tongues is made approximately the same as that of the columns.

Moreover, with the speed sensing rolling bearing unit according to the present invention, the hanging down of the long harness 15 at the time of shipping, at the time of assembly, and prior to completion of installation in a vehicle can be prevented. More specifically, prior to completion of installation (for example before inserting the engaging portion 48 into the assembly bore of the knuckle, and securing the attachment portion 7 to the knuckle), the holder 43 can be externally fitted to the outer ring member 9, by externally fitting the support cylinder portion 44 to the cylindrical portion 26 of the cover 25. Before externally fitting the holder 43, the connector 51 is passed out through the widened portion 50 to the opposite side of the connecting portion 45.

Then after externally fitting the holder 43 to the cover 25, the harness 15 which has been passed out to the opposite side of the connecting portion 45, is wound around the wrapping tubeportion 46. The connector 51 which is connected to the end of the harness 15 is then pushed into the engagement portion 53 for interlocking therewith. Since the length of the harness 15 is fixed, then if the location of the engagement portion 53 and the outer diameter of the wrapping tube portion 46 are appropriately specified, no portion of the harness 15 will protrude radially outward from the outer peripheral face of the support cylinder portion 44.

Moreover, since the arcuate walls 54 surround the harness 15 when wound onto the wrapping tube portion 46, then the harness 15 is not likely to become erroneously unwound. As a result of winding the long harness 15 around the wrapping tube portion 46, then at the time of shipping and installation of the speed sensing rolling bearing unit, the harness 15 does not hang down and cause an obstruction.

The holder 43 is removed after the outer ring member 9 is fitted to a member such as a knuckle on the side of the suspension unit, and prior to connecting the connector 51 to another connector on the chassis side. The removed holder 43 can then be returned as required to the manufacturing site of speed sensing rolling bearing unit, and fitted to a new speed sensing rolling bearing unit.

Figure 6:
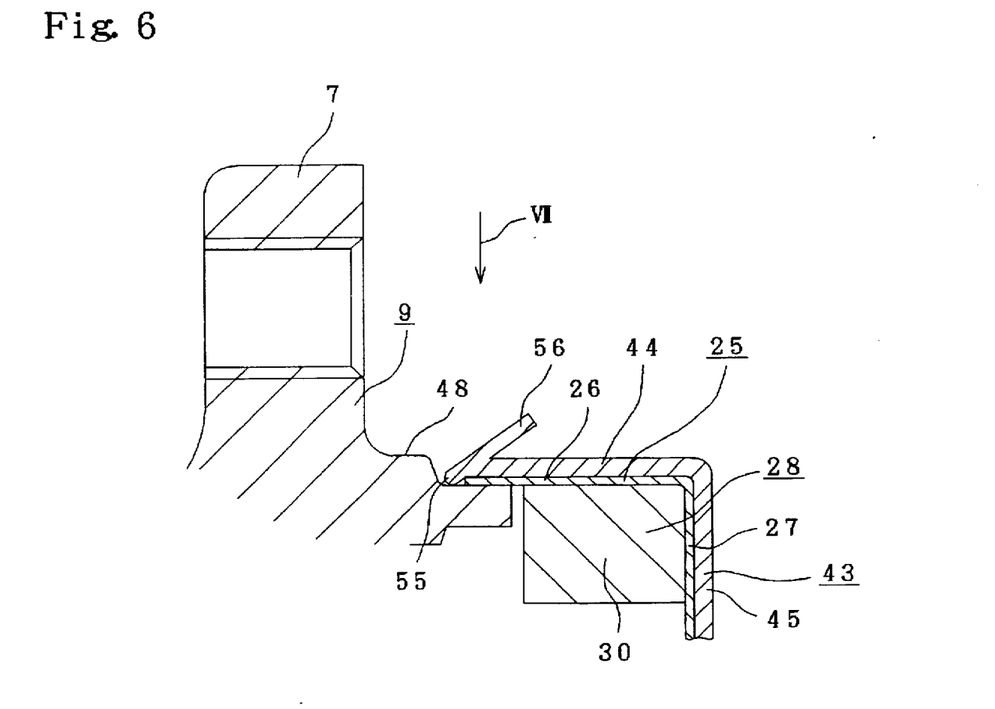
FIG. 6 is a partial cross-sectional view corresponding to portion VI of FIG. 1, illustrating a second embodiment of the present invention.
Figure 7:
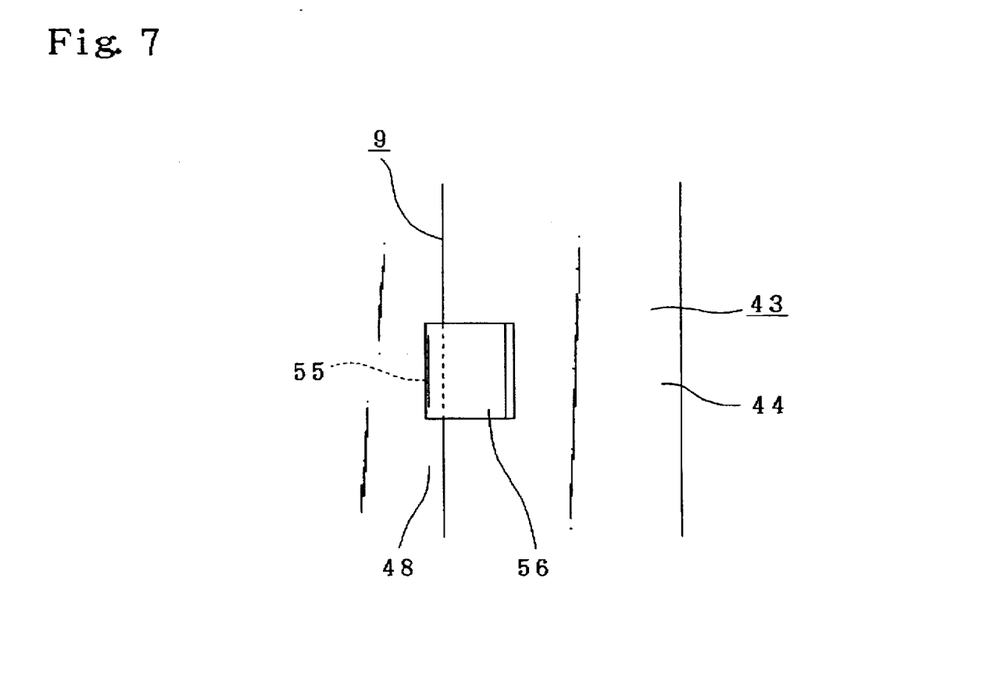
FIG. 7 is a view on arrow VII of FIG. 6.

FIGS. 6 and 7 illustrate a second embodiment according to the present invention. With this embodiment, a hook portion 55 which is engaged and disengaged by lever action with a press member 56, is formed integrally with the holder 43, on the open end rim of the support cylinder portion 44 of the holder 43. In the free condition, the tip end of the hook portion 55 protrudes radially inwards from the inner peripheral face of the support cylinder portion 44, so as to engage with the end rim of the cylindrical portion 26 of the cover 25, and thus help to prevent the support cylinder portion 44 from coming off. At the time of removing the support cylinder portion 44, the press member 56 is pressed radially inward thus moving the hook portion 55 outwards by lever action.

With this second embodiment, when the engaging portion 48 is inserted into the assembly bore, there is a possibility of obstruction from the press member 56. Hence in this case the holder 43 is taken off prior to insertion. With this embodiment also however, since the harness 15 does not hang down during shipping, obstruction caused by the harness during shipping can be avoided.

With the abovedescribed speed sensing rolling bearing unit of the present invention constructed and operated as described above, since the long harness does not cause an obstruction during shipping or during installation of the speed sensing rolling bearing unit, then the efficiency of these operation can be improved. Moreover, since the harness is not damaged during handling, then the reliability of an anti-lock braking system (ABS) or a traction control system (TCS) incorporating such a speed sensing rolling bearing unit fitted with the harness can be improved.

In the embodiments mentioned above, the sensor of the variable reluctant (VR) type is used. It should be noted that the present invention can be applied to the structures having an active sensor using magnetism or a photo-sensor. In addition, the sensor using magnetism can have a structure where the tone wheel is formed in a magnet structure with multi poles, so that the sensor has no magnet.

In addition, the tone wheel in the photo sensor structure has photo-permeable and impermeable portions or reflecting and non-reflecting portions juxtaposed.

What is claimed is:

1. A rolling bearing unit with rotational speed sensor comprising a stationary outer ring member having an outer ring raceway on an inner peripheral face thereof and an open end portion, a rotatable inner ring assembly having an inner ring raceway on an outer peripheral face thereof, a plurality of rolling elements provided between the outer ring raceway and the inner ring raceway, a cover fixed to the open end portion of the outer ring member, a sensor supported inside the cover, a rotatable tone wheel supported on the inner ring assembly, a harness for taking out an output signal from the sensor, a connector connected to the harness, and a holder releasably engaged with the cover, the holder comprising a support cylinder portion externally engagable with the cover and having an end rim, a connecting portion bent radially inwards from the end rim of the support cylinder portion and having an inner peripheral rim and an opening, a wrapping tube portion formed on the inner peripheral rim of the connecting portion to protrude in an axially opposite direction to the support cylinder portion, an engagement portion formed on the connecting portion on the same side as the wrapping tube portion, so as to be engaged with the connector, so that the connector and harness can freely pass through the opening in the connecting portion.

* * * * *